Patented July 21, 1942

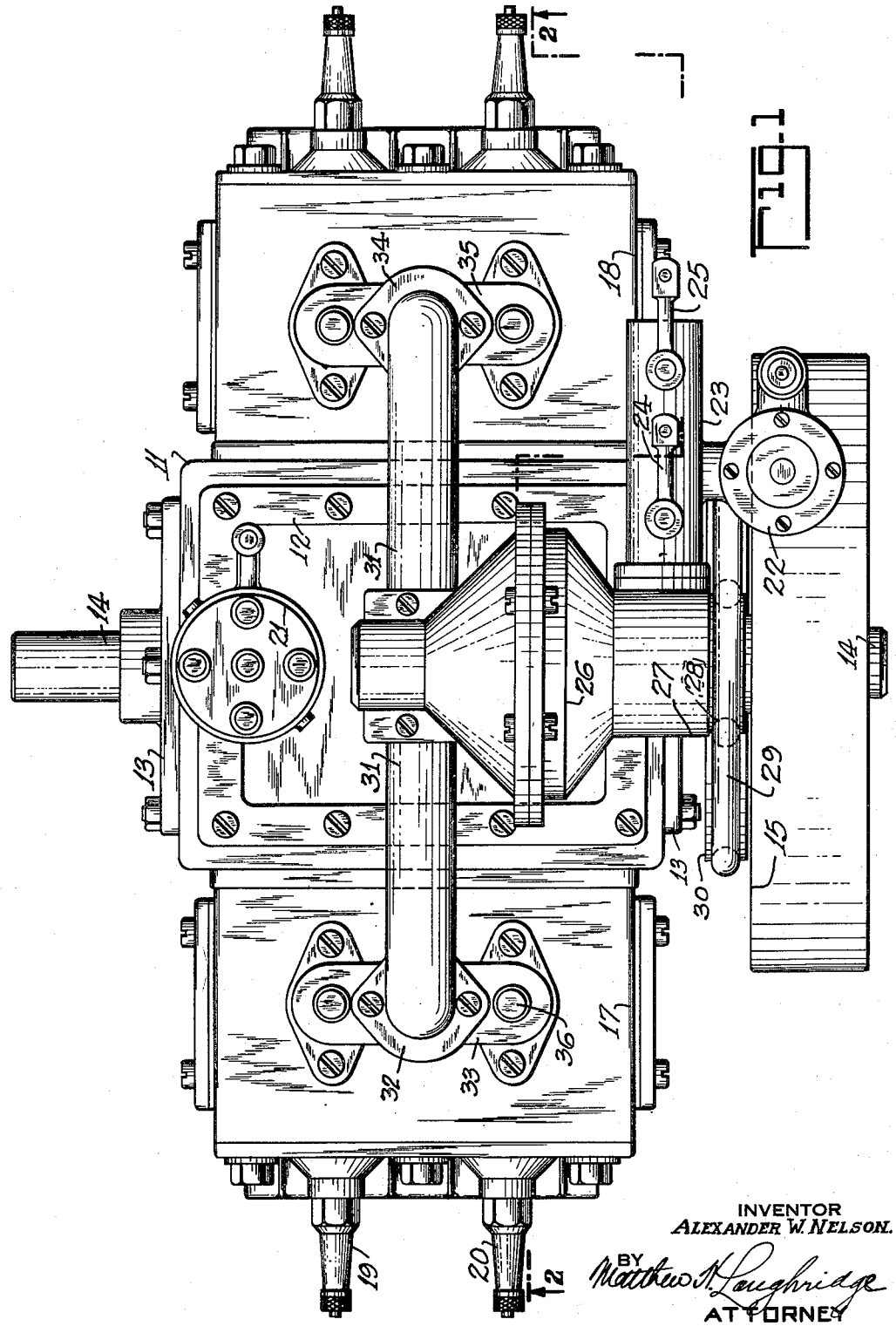

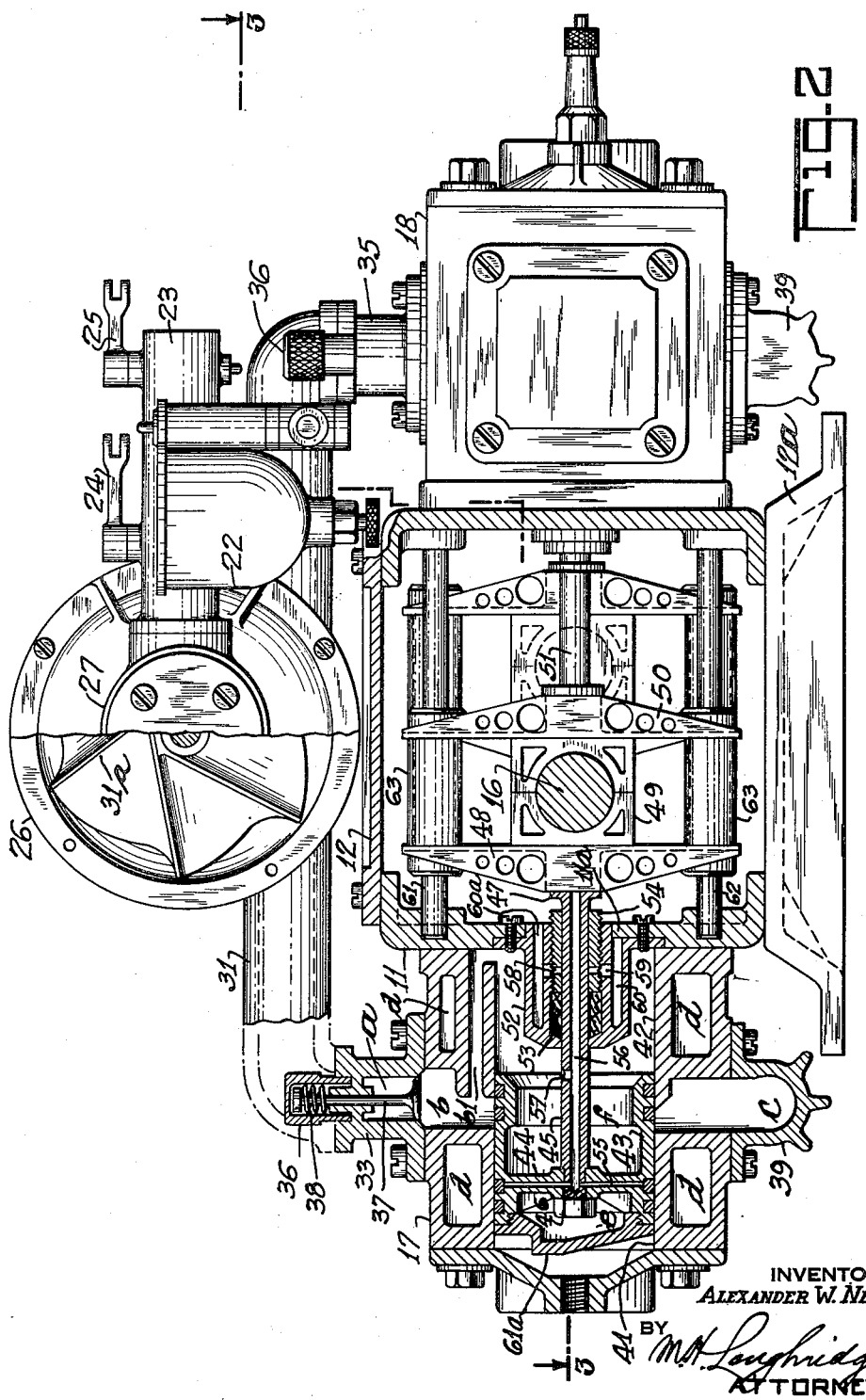

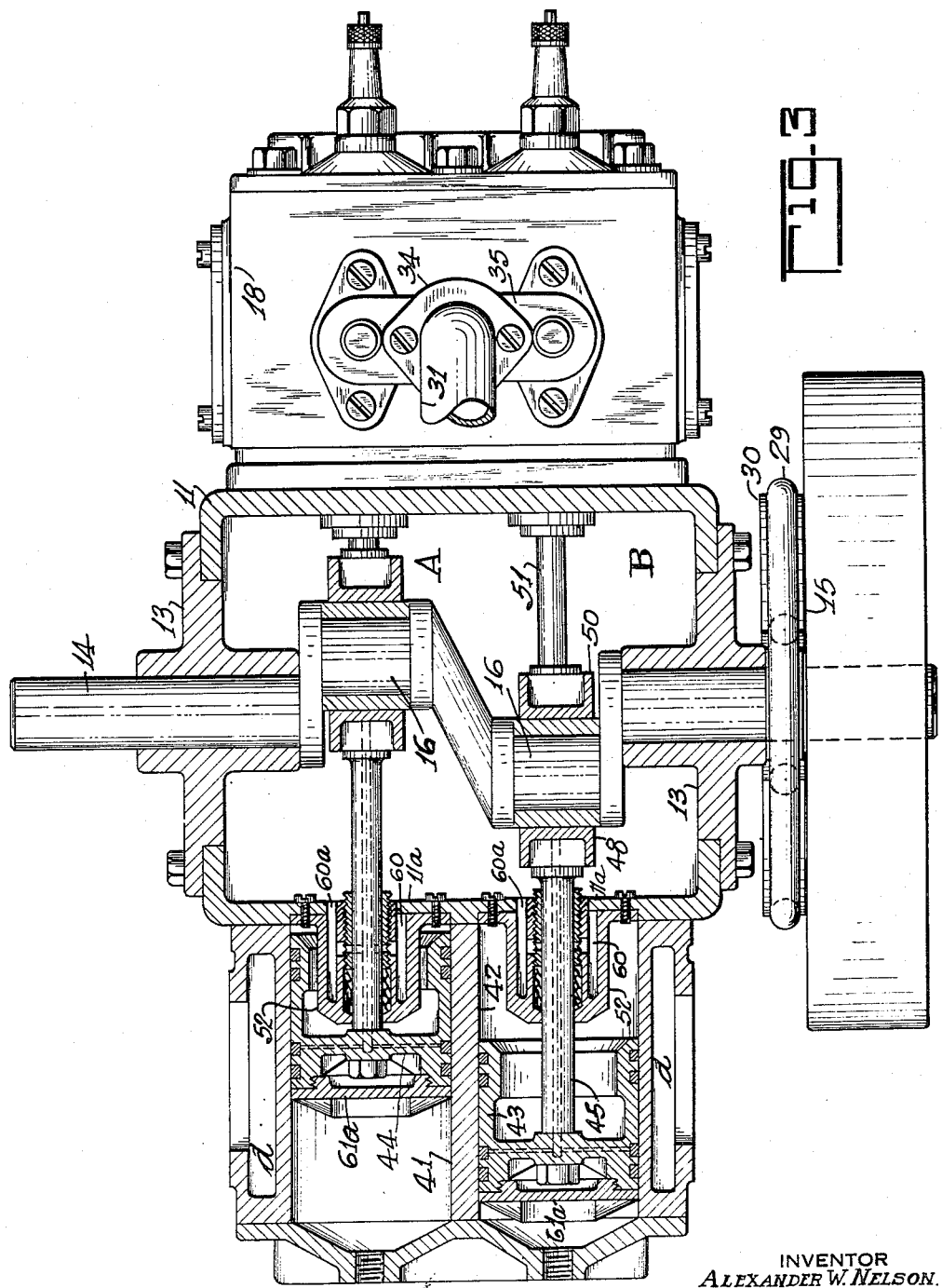

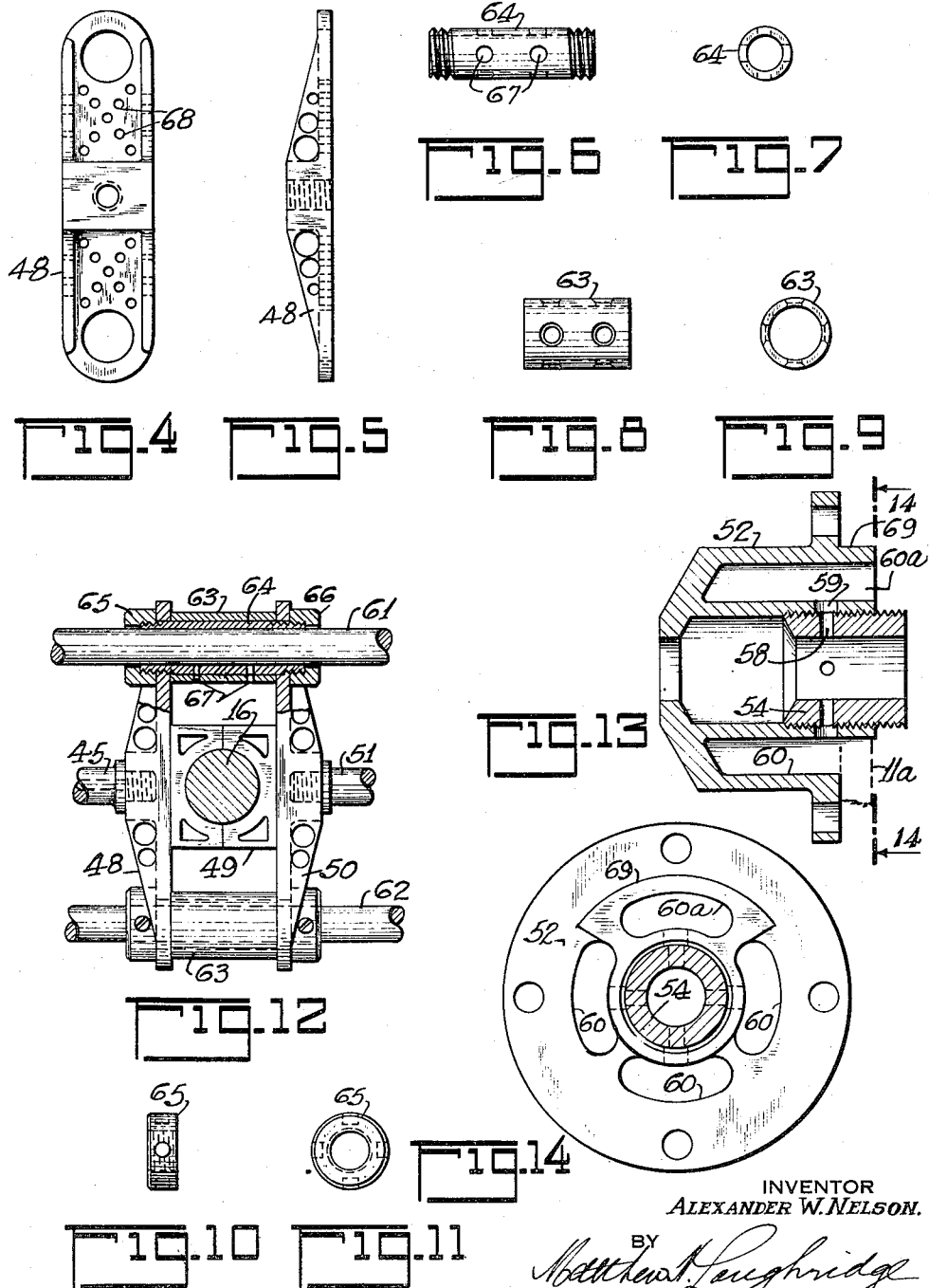

2,290,202

UNITED STATES PATENT OFFICE 2,290,202

INTERNAL COMBUSTION ENGINE

Alexander W. Nelson, Belleville, N. J., assignor to Nelson & Olsen Motors Developing Corporation, Orange, N. J., a corporation of New Jersey Application April 21, 1941, Serial No. 389,618

15 Claims. (Cl. 123—56)

This invention relates to internal combustion engines and has for an object to provide an engine of the two cycle type that is compact and occupies relatively small space for the power developed, that has a low center of gravity and that may be operated with the cylinders horizontal. Other objects of the invention reside in an improved method of obtaining compression; an improved stuffing box for the piston; a piston connection to the piston rods which shields the rod from the heat of the cylinder and an improved oiling system. These and other objects of the invention will be more particularly understood from the following specification and the accompanying drawings, in which:

Fig. 1 is a top plan view of a four cylinder engine complete;

Fig. 2 is an elevation, partly sectioned, on line 2—2 of Fig. 1;

Fig. 3 is a plan view, partly sectioned, on line 3—3 of Fig. 2;

Fig. 4 is a rear view and Fig. 5 is a side view of a scotch yoke used in transmitting power to the crank shaft from a pair of opposed cylinders;

Fig. 6 is a side view and Fig. 7 is an end view of a tubular slide for the scotch yoke;

Fig. 8 is a side view and Fig. 9 is an end view of the spacer used in the scotch yoke;

Fig. 10 is a side view and Fig. 11 is an end view of the clamping nuts used in the scotch yoke;

Fig. 12 is an elevation of the scotch yoke with one of the slides shown in section;

Fig. 13 is a cross-section of the stuffing box and oil sump; and Fig. 14 is an end view on line 14—14 of Fig. 13.

In the present invention a pair of opposed cylinders operating on the two cycle principle are connected to the crank shaft by a scotch yoke so that the piston rod is rigidly connected to each piston and passes through a stuffing box where it enters the crank chamber. The working cylinder and the compressor are axially aligned, one end being the working cylinder and the opposite end the compressor in which the outer end of the piston receives the firing impulse and the inner end compresses the fuel charge against the closed end of the cylinder. The stuffing box for the piston rod projects into the compression chamber and enters the open end of the piston at the inward portion of the stroke and thereby compresses the fuel charge which has been taken into the compressor from the feed manifold through a spring seated check valve which confines the charge in the compressor until the port to the cylinder is opened by the inward movement of the piston.

An oiling system is provided through a conduit or duct in the piston rod which has an outlet under one of the piston rings to lubricate the cylinder. The stuffing box is provided with a hollow annular chamber in which oil is maintained and a port to the conduit in the piston rod connects with this oil sump when the piston is in the inner position and when the piston returns to the outer position this port is exposed to the pressure in the compression chamber, thereby applying pressure to the oil and forcing the lubrication of the piston.

In order to prevent the excess heat of the combustion in the cylinder from being transmitted to the piston rod and to the compression and crank shaft chambers a flanged head is provided in the piston to which the end of the piston rod is attached and a thrust head, spaced from the flanged head, is secured to the end of the piston and is exposed to the heat of the working cylinder.

A forced feed or supercharger is provided for the fuel charge on the fuel manifold and is driven by a belt connection from the engine shaft. The intake of each cylinder is provided with a spring seated check valve which opens by the force of the feed but which automatically closes as the pressure in the compressor rises. This enables the fuel charge to be applied rapidly to the compressor and enables the compressor to deliver the compressed fuel to the cylinder with a high degree of compression.

In the drawings, Fig. 1, 11 is the crank case provided with the cover 12 and which may be mounted on a supporting base 12a, Fig. 2. Bearing plates 13 are provided at opposite sides for the crank shaft 14 upon which the fly wheel 15 is mounted. A cylinder block 17, with a pair of cylinders having the spark plugs 19 and 20, are mounted on one side of the crank case and a corresponding pair of cylinders 18 are mounted on the opposite side of the crank case and in opposition to the cylinders 17.

The fuel feed system comprises the carburetter 22 connecting to conduit 23 where the feed is controlled by levers 24 and 25 in a manner well known in the art and which is only typically represented. From 23 connection is made through 27 to the super-charger 26 which is provided with a suitable turbine 31a, Fig. 2, driven by belt wheel 28 and belt 29 from wheel 30, mounted on shaft 14. The supercharger 26 connects to the intake manifold 31 which terminates in a flange 32 at one end and connects with the cross member 33 which has a channel $a$ connecting with the intake port $b$ and controlled by valve 37, normally seated by spring 38 and protected by cap 36 which may be removed for adjusting the tension of the valve. One of these check valves is provided for the intake of each cylinder, the connection to the cylinder block 18 being made through the flange 34 and the cross member 35 corresponding with 33. The distributor for the ignition system is indicated at 21 and is operated by the engine mechanism in the usual manner, not shown in the drawings. The engine exhaust is taken off at $c$ through a suitable housing indicated at 39.

The working cylinder, Fig. 2, is indicated at 41 and the compression cylinder 42 is a continuation thereof in which the piston 43 works. This piston is provided with a flanged head 44 to which the piston rod 45 is rigidly connected by the nut 46. The outer end of the piston rod connects at 47 with the member 48 of the scotch yoke which, through the bearing 49, connects with the crank pin 16 of the crank shaft 14. The scotch yoke includes the complimentary member 50 similarly connected to the piston rod 51 of the opposing cylinder.

The piston rod 45 works through a stuffing box 52 which is secured to the crank case and projects into the compression chamber 42. A gland 53 seals the compression chamber and piston rod and is held in place by the screw sleeve 54. The piston is provided with an axial conduit 56 which connects by the conduit 55 in the flanged head 44 with the seat of one of the piston rings. A port 57 connects with the conduit 56 and when the piston is in the inner position this port registers with an aperture 58 in the screw sleeve 54 and an aperture 59 in the wall of the stuffing box and connects with the sump 60 which surrounds the stuffing box. In the inner position a charge of oil from sump 60 is applied to conduit 56 and, as the piston returns, port 57 is exposed in the compression chamber, thereby providing an impulse through this port to force the oil under the piston ring for lubricating the piston. The detailed construction of the stuffing box is shown in Figs. 13 and 14 from which it will be noted that four ports may be provided, corresponding to 57 in the piston rod to register with corresponding apertures in the stuffing box. It will be noted that a flange is provided at 69 which projects from the face of the stuffing box opposite the aperture 60a and which permits this aperture to open into the crank case and through which a flow of oil is maintained from the crank case unless a separate oiling outlet is provided for the sump. It will be noted further that the crank case at 11a covers the three apertures indicated at 60, Fig. 14, so that the oil entering the sump at the top through 60a is retained and is constantly fed to the piston as described.

The piston 43 is provided with the thrust head 61a screwed on the outer end and spaced from the flange head 44 by the space $e$ which insulates this head from the nut 46 and the flange head 44 and prevents the excessive heat of the piston from reaching the piston rod. This also enables the thrust head of the piston to be easily replaced.

The construction of the scotch yoke will be understood from the details, Fig. 4 to 12 inclusive. This is constructed in the form of a cross head operating on the slide bars 61 and 62 upon which the opposing members 48 and 50 are mounted, are spaced by the sleeves 63 and are clamped by the sliding tube 64 secured by the nuts 65 and 66. Apertures are provided at 67 in 63 and 64 whereby the slide is lubricated by the splash system obtained by the operation of the bearing block 49, back and forth between the plates 48 and 50. These plates are channel shaped to secure strength with light weight and are provided with apertures at 68 for lubricating purposes.

In operation the return motion of the piston creates a partial vacuum in the compression chamber $f$. This causes valve 37 to open, connecting the manifold and feed chamber $a$ with chamber $b$ and through the passage $b1$ the charge enters the compression cylinder 42. Owing to the forced feed the compression cylinder is rapidly charged with a considerable initial pressure. After firing the piston returns to the position indicated at A Fig. 3 in which the stuffing box 52 enters the hollow portion of the piston and, in cooperation with the movement of the piston, greatly reduces the space of the compressor and produces a relatively high pressure in the compressor at the time when the port leading from $b$ is opened to the working cylinder by the inward movement of the piston. This insures a super-charge of the fuel mixture in the cylinder which is further compressed as the piston returns to the firing position, as indicated at B, Fig. 3.

The crank pins as indicated at A and B, Fig. 3, are located at 180° apart as indicated and two of the pistons are always under compression with the result that the engine always stops with the pistons at mid-stroke, which in certain cases may be used to facilitate restarting the engine.

The engine is water-jacketed as indicated at $d$ in the usual way and connected with the circulating system.

It will be noted that the stroke of the working cylinder corresponds with the stroke of the compressor and there is no increase in length in the cylinders for this purpose. This enables a compact engine to be constructed of relatively high power and an engine that can be located in relatively small space.

Having thus described my invention, I claim:

1. An internal combustion engine of the two cycle type comprising a crankcase, a pair of opposed cylinders with pistons, a crank shaft, a scotch yoke comprising a pair of parallel rods mounted in the wall of the crank case, a sleeve sliding on each rod, a spacer on each sleeve, the opposing heads of said yoke having apertures at each end for said sleeve and engaging each spacer, and means for securing said heads on said sleeve to form a cross-head for said crank shaft.

2. An internal combustion engine comprising a cylinder, a compression chamber, a hollow piston working in said cylinder and chamber, a piston rod rigidly connected to said piston, a stuffing box with an annular oil sump for said piston rod in the wall of said chamber projecting into said chamber and substantially filling said hollow piston in the compression position, means connecting said oil sump with said piston and a port connecting said chamber and cylinder controlled by the movement of said piston.

3. An internal combustion engine comprising a working cylinder and an axially aligned compressor, with a piston working in said cylinder and compressor, a piston rod connected to said piston, a stuffing box in the wall of said compressor for said rod, an enclosed oil sump in said stuffing box having a port opposite said piston rod and closed by said rod, a conduit in said rod having an opening in said piston, and a port connecting with the port of said oil sump as said rod is reciprocated.

4. An internal combustion engine comprising a cylinder block having a working cylinder with a piston having rings working therein, a piston rod connected to said piston, a stuffing box for said rod in a wall of said cylinder block, a conduit in said rod having an outlet in the seat of one of the piston rings, an annular enclosed oil sump on the outside of said stuffing box having a port opposite the piston rod and closed by the piston, and a port in said rod connecting with the port of said oil sump to supply oil as the piston is reciprocated to said ring.

5. An internal combustion engine comprising a working cylinder and an axially aligned compressor with a piston working therein, a piston rod connected to said piston, a stuffing box for said rod in a wall of said compressor, a conduit in said rod having an outlet in the seat of one of the piston rings, an oil sump on the outside of said stuffing box and a port in said rod connecting with said oil sump to supply oil as the piston is reciprocated to said ring and connecting with the compression chamber to supply pressure for feeding the oil to the piston.

6. An internal combustion engine comprising a firing cylinder with a piston having a skirt working therein, said piston having an integral flange spaced from its ends, a piston rod rigidly connected to said flange and a removable head for said piston exposed to the firing cylinder and spaced from said flange and piston rod.

7. An internal combustion engine comprising a firing cylinder with a piston having a skirt working therein, said piston having a solid internal flange spaced from its ends, a piston rod, an attachment including a nut rigidly securing said piston rod to said flange and a domed head for said piston exposed to the firing cylinder, said head having a threaded flange screwed into the socket end of the piston and spaced from said piston rod and nut.

8. An internal combustion engine comprising a cylinder, a piston in said cylinder having an annular flange and a piston ring seated thereon, a conduit connecting said flange with the seat of said piston ring, a piston rod connected to said flange and having a conduit connected with the conduit of said flange, and means for forcing oil into the conduit of said rod as the piston reciprocates in said cylinder.

9. An internal combustion engine comprising a cylinder, a piston in said cylinder having an annular flange and piston rings, and a conduit connecting said flange with the seat of one of said piston rings, a piston rod connected to said flange and having a conduit connected with the conduit of said flange, a stuffing box for said piston rod and a valve for the conduit in said rod controlled by the reciprocating movement of said rod in said stuffing box.

10. An internal combustion engine comprising a cylinder, a piston in said cylinder having an annular flange and piston rings, and a conduit connecting said flange with the seat of one of said piston rings, a piston rod connected to said flange and having a conduit connected with the conduit of said flange, a fixed oil sump associated with said rod and a valve for the conduit in said rod controlled by the reciprocating movement of said rod relative to said oil sump.

11. An internal combustion engine comprising a cylinder, a piston reciprocatable therein, a crank shaft, a pair of parallel rods, sleeves reciprocatable on said rods, a pair of opposed yoke members disposed on opposite sides of said crank shaft and connected to said sleeves to form a cross head for a portion of said crank shaft and a rod connecting said piston to one of said yoke members.

12. An internal combustion engine comprising a cylinder, a piston reciprocatable therein, a crank case, a piston rod for the piston having a conduit extending lengthwise thereof for passage of lubricant to the piston, an oil sump disposed adjacent to and in communication with said crank case from which it is adapted to receive oil, said sump having a port normally closed by said rod, and said rod having a port communicating with the conduit thereof adapted to be periodically brought into communication with the port of said sump as said rod is reciprocated.

13. An internal combustion engine comprising a cylinder, a piston reciprocatable therein, a piston rod connected to said piston, a stuffing box for said rod having a packing gland, an oil sump and a port for the sump normally closed by said rod, said rod having an opening adapted to be brought during reciprocation of the rod into periodic communication with the port of said sump to receive oil therefrom, to permit oil thus received to be transferred to said packing to maintain the packing in a lubricated state.

14. An internal combustion engine comprising a compression chamber, a piston rod reciprocatable relative to said compression chamber, said rod having a conduit extending lengthwise thereof for passage of lubricant therethrough, an oil sump having a port normally closed by said rod, and said rod having a port communicating with the conduit thereof adapted to be brought during reciprocation of the rod into alternate communication with the port of said sump and the space of said compression chamber.

15. An internal combustion engine having a firing cylinder, a piston reciprocatable therein, said piston having a flange disposed crosswise of the piston between the ends thereof, a head member substantially coextensive in size to the end of said piston, and means to secure the head member to said piston in spaced relation to said flange to provide an insulating dead air space in the head portion of the piston.

ALEXANDER W. NELSON.